United States Patent [19]
Ohta

[11] Patent Number: 5,130,819
[45] Date of Patent: Jul. 14, 1992

[54] IMAGE PROCESSING APPARATUS
[75] Inventor: Kenichi Ohta, Yokohama, Japan
[73] Assignee: Canon Kabushiki Kaisha, Tokyo, Japan
[21] Appl. No.: 598,157
[22] Filed: Oct. 16, 1990
[30] Foreign Application Priority Data
Oct. 17, 1989 [JP] Japan .................. 1-268224
[51] Int. Cl.$^5$ .............................. H04N 1/40
[52] U.S. Cl. .................... 358/445; 358/443
[58] Field of Search .......... 358/443, 456, 466, 447, 358/448, 463, 445; 382/54

[56] References Cited
U.S. PATENT DOCUMENTS

| | | | |
|---|---|---|---|
| 4,876,610 | 10/1989 | Ohsawa et al. | 358/456 |
| 4,878,125 | 10/1989 | Katayama et al. | 358/456 |
| 4,891,710 | 1/1990 | Nakazato et al. | 358/443 |
| 5,008,950 | 4/1991 | Katayama et al. | 398/447 |
| 5,050,000 | 9/1991 | Ng | 358/466 |
| 5,068,746 | 11/1991 | Ohsawa et al. | 358/443 |

Primary Examiner—Edward L. Coles, Sr.
Assistant Examiner—Thomas L. Stoll
Attorney, Agent, or Firm—Fitzpatrick, Cella, Harper & Scinto

[57] ABSTRACT

An image processing apparatus that converts multi-level pixel data to binary pixel data and outputs it includes, in one embodiment, an input device for accepting multi-level pixel data, a binary conversion device for converting multi-level pixel data input from the input device to binary pixel data on the basis of a threshold value, an output device for outputting the binary pixel data which has been binarized by the binary conversion device, a first and a second memory in which errors and binary pixel data are stored, respectively, a correction device for correcting multi-level pixel data, a first and a second average density computation device for computing an average density value, a computation device for computing the average value of the average density values computed by the first and second average density computation devices as a threshold value, a detection device for detecting an error value, and a distribution device for distributing an error value to unbinarized pixel positions.

12 Claims, 7 Drawing Sheets

| f(i−1, j−1) | f(i, j−1) | f(i+1, j−1) |
|---|---|---|
| f(i−1, j) | f(i, j) | f(i+1, j) |

| B(i−1, j−1) | B(i, j−1) | B(i+1, j−1) |
|---|---|---|
| B(i−1, j) | B(i, j) | B(i+1, j) |

FIG.3(B)

| R(−1, −1) | R(0, −1) | R(1, −1) |
|---|---|---|
| R(−1, 0) | R(0, 0) | 0 |

FIG.3(C)

|  | e(i, j) | e(i+1, j) | e(i+2, j) |
|---|---|---|---|
| e(i−1, j+1) | e(i, j+1) | e(i+1, j+1) | e(i+2, j+1) |
| e(i−1, j+2) | e(i, j+2) | e(i+1, j+2) | e(i+2, j+2) |

FIG.3(D)

| 3 | 5 | 3 |
|---|---|---|
| 5 | 7 | 0 |

× $\frac{1}{23}$

FIG.4

FIG.5(A)  OBJECTIVE PIXEL

|  | S(0,0) | S(1,0) | S(2,0) |
|---|---|---|---|
| S(-1,1) | S(0,1) | S(1,1) | S(2,1) |
| S(-1,2) | S(0,2) | S(1,2) | S(2,2) |

FIG.5(B)

|  | * | 0 | 1/2 |
|---|---|---|---|
| 0 | 0 | 0 | 0 |
| 0 | 1/2 | 0 | 0 |

FIG.5(C)

|  | * | 0 | 1/3 |
|---|---|---|---|
| 0 | 0 | 0 | 0 |
| 0 | 1/3 | 0 | 1/3 |

|   | * | 1/2 | 0 |
|---|---|-----|---|
| 0 | 1/2 | 0 | 0 |
| 0 | 0 | 0 | 0 |

FIG. 6
(PRIOR ART)

OBJECTIVE PIXEL → DIRECTION OF PROCESS

|   |   | * | 7/48 | 5/48 |
|---|---|---|------|------|
| 3/48 | 5/48 | 7/48 | 5/48 | 3/48 |
| 1/48 | 3/48 | 5/48 | 3/48 | 1/48 |

FIG. 7
(PRIOR ART)

|   |   | * | 0 | 5/34 |
|---|---|---|---|---|
| 3/34 | 5/34 | 0 | 5/34 | 3/34 |
| 1/34 | 3/34 | 5/34 | 3/34 | 1/34 |

FIG.8(A)

|   |   | * | 0 | 5/29 |
|---|---|---|---|---|
| 3/29 | 5/29 | 0 | 0 | 3/29 |
| 1/29 | 3/29 | 5/29 | 3/29 | 1/29 |

FIG.8(B)

IMAGE PROCESSING APPARATUS

BACKGROUND OF THE INVENTION

The present invention relates to an image processing apparatus and, in particular, to an image processing apparatus that binarizes multi-level pixel data and outputs them.

There has previously been known an average density approximation (Information Processing Society of Japan (thesis) Vol. 26, No. 1, 1985) as one of the pseudo-halftone processing methods by which image data is binarized with high precision.

This technique will now be explained briefly. In binarizing input multi-level pixel data, a weighted average density value when an objective pixel is binarized to "1" and a weighted average density value when an objective pixel is binarized to "0" are determined by using binary data in the vicinity of an objective pixel which has already been binarized. The average value of these two weighted average density values is computed. Therefore, the objective pixel is binarized by comparing the computed average value with the value of the objective multi-level pixel. In this method, however, the number of gradations which can be expressed is limited by the magnitude of a weight mask for computing an average density value. Consequently, there arises a problem in that a halftone image cannot be binarized.

Meanwhile, a method has been proposed in which a binary conversion error caused when an objective pixel is binarized is distributed to the next pixel and an overall density is stored so as to improve gradation. In this case, however, since the binary conversion error is distributed to the next pixel adjacent to the objective pixel, the correlation between adjacent pixels becomes lower. For example, when an objective pixel is binarized to "1", since an error caused is negative sign, the adjacent pixel is likely to be binarized to "0". Conversely, when the objective pixel is binarized to "0", since the error caused is positive in sign, the next pixel is likely to be binarized to "1". When the correlation between adjacent pixels is low as described above, if a reduced image is produced by, for example, thinning out half of the binarized data, only "1"s are thinned out or only "0"s are thinned out, and therefore the image after thinning out deteriorates considerably. If an image is displayed on an interlace type display device such as a CRT monitor that performs interlaced scanning every other line, a problem arises, namely, flickering occurs in a screen because the correlation between fields is low.

Another known pseudo-halftone processing includes an error diffusion method. Since a binary conversion error is distributed to adjacent pixels at a maximum ratio, the same problem as above arises.

SUMMARY OF THE INVENTION

The present invention has been devised in light of the above-described conventional technology. An object of the present invention is to provide an image processing apparatus that generates binary images having a higher correlation between adjacent pixels.

To achieve this object, according to the present invention, there is provided an image processing apparatus that converts multi-level pixel data to binary pixel data and outputs it while keeping the density of the multi-level pixel data, comprising a binary conversion means that distributes a density error caused when binary data corresponding to input objective pixel data is generated, to the unbinarized pixel positions in the vicinity of an objective pixel except unbinarized pixel positions adjacent to the objective pixel.

Another object of the present invention is to provide an image processing apparatus that generates binary images having a higher correlation between adjacent pixels and a high quality.

To achieve this object, according to the present invention, there is provided an image processing apparatus that converts multi-level pixel data to binary pixel data and outputs it, comprising:

input means for accepting multi-level pixel data;

binary conversion means for converting multi-level pixel data input from the input means to binary pixel data on the basis of a threshold value;

output means for outputting the binary pixel data which has been binarized by the binary conversion means;

a first memory in which errors caused when multi-level pixel data of as much as two or more lines is binarized by the binary conversion means are stored;

a second memory in which binary pixel data of as much as two or more lines binarized by the binary conversion means is stored;

correction means for correcting multi-level pixel data input by the input means with error data accumulated in the vicinity of the positions of the multi-level pixel data in the first memory;

first average density computation means for computing an average density value at the objective pixel position in the case where it is assumed that the objective multi-level pixel data corrected by the correction means is binarized to the darkest density pixel data, on the basis of binarized pixel data stored in the second memory;

second average density computation means for computing an average density value at the objective pixel position in the case where it is assumed that the objective multi-level pixel data corrected by the correction means is binarized to the lightest density pixel data, on the basis of binarized pixel data stored in the second memory;

computation means for computing the average value of the average density values computed by the first and second average density computation means as a threshold value;

detection means for detecting an error value caused when the multi level pixel data is binarized by the binary conversion means; and distribution means for distributing an error value detected by the detection means to unbinarized pixel positions except at least pixel positions adjacent to the objective pixel position in the first memory.

A further object of the present invention is to provide an image processing apparatus that generates binary images having a higher correlation between adjacent pixels in an image processing system in which a manuscript image is read in as a multi-level image, the read-in multi-level image is converted to a binary image by means of a binary conversion means, and the converted image is displayed and edited.

To achieve this object, according to the present invention, there is provided an image processing system in which a manuscript image is read out as a multi-level image, the read-out multi-level image is converted to a binary image by a binary conversion means, and the converted image is displayed and edited, wherein the binary conversion means distributes a density error caused when multi-level pixel data constituting the read-out multi-level image is converted to binary pixel data, to unbinarized pixel positions in the vicinity of an objective pixel except at least unbinarized pixel positions adjacent to the objective pixel position.

A still further object of the present invention is to provide an image processing system which is capable of making it difficult for flickering to occur in an edit screen and obtaining a print result with a small amount of image deterioration even if a reduced and edited binary image is printed, and in which system a manuscript image is read in as a multi-level image, the read-in multi-level image is converted to a binary image by means of a binary conversion means, and the converted image is displayed and edited.

To achieve this object, according to the present invention, there is provided an image processing system in which a manuscript image is read out as a multi-level image, the read-out multi-level image is converted to a binary image by a binary conversion means, comprising:

binary conversion means for converting multi-level pixel data constituting the multi-level image to binary pixel data on the basis of a threshold value;

a first memory in which two or more lines of density errors caused when a multi-level image is binarized by the binary conversion means are stored;

a second memory in which two or more lines of binary pixel data binarized by the binary conversion means are stored;

correction means for correcting read-out multi-level pixel data with error data accumulated in the vicinity of the positions of the multi-level pixel data in the first memory;

first average density computation means for computing an average density value at the objective pixel position in the case where it is assumed that the objective multi-level pixel data corrected by the correction means is binarized to the darkest density pixel data, on the basis of binarized pixel data stored in the second memory;

second average density computation means for computing an average density value at the objective pixel position in the case where it is assumed that the objective multi-level pixel data corrected by the correction means is binarized to the lightest density pixel data, on the basis of binarized pixel data stored in the second memory;

computation means for computing the average value of the average density values computed by the first and second average density computation means as a threshold value;

detection means for detecting an error value caused when the multi-level pixel data is binarized by the binary conversion means; and distribution means for distributing an error value detected by the detection means to at least one unbinarized pixel position except pixel positions adjacent to the objective pixel position in the first memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3(A) to 3(D) are views showing the various types of matrices for explaining the outline of the binary conversion processing of the embodiment of FIG. 1;

FIG. 4 is a view showing one example of a weight mask for computing an average density value;

FIG. 5(A) is a view showing distribution coefficients when a binary conversion error is distributed;

FIGS. 5(B) and 5(C) views showing concrete values of the distribution coefficients;

FIG. 6 is a view showing conventional distribution coefficients;

FIG. 7 is a view showing one example of a diffusion matrix in a conventional error diffusion method;

FIGS. 8(A) and 8(B) are views showing one example of a diffusion matrix when it is applied to the error diffusion method in the embodiment of FIG. 1.

DESCRIPTION OF THE PREFERRED EMBODIMENT

The preferred embodiments of the present invention will now be explained in detail with reference to the accompanying drawings.

Figure 1:
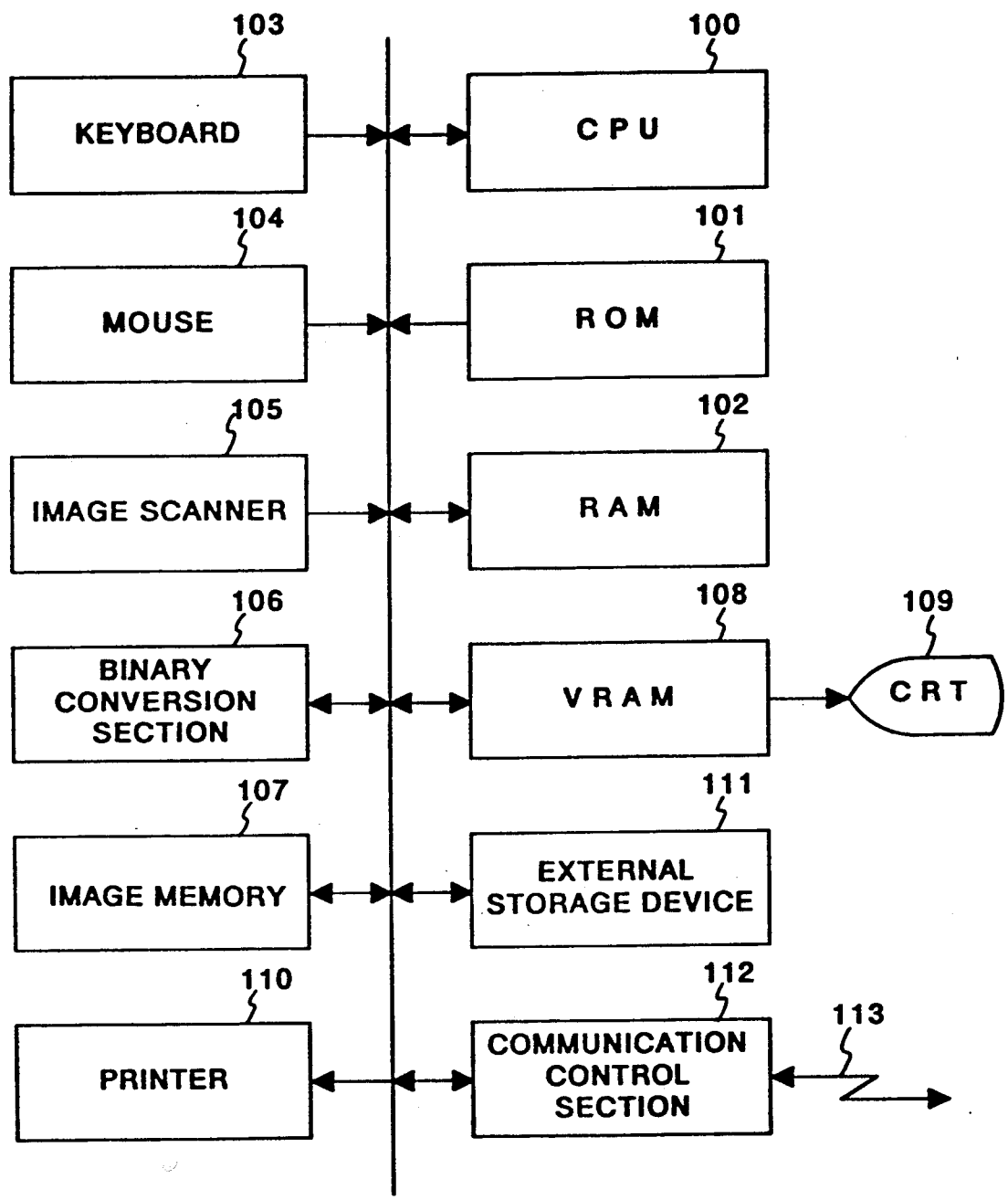
FIG. 1 is a block diagram of an image editing system according to an embodiment of the present invention.

FIG. 1 is a block diagram of an image editing system in an embodiment of the present invention.

In FIG. 1, reference numeral 100 denotes a CPU that controls the whole of this system, 101 denotes a ROM in which a boot program and character patterns are stored, 102 denotes a RAM into which programs are loaded or which is used as a work area, 103 denotes a keyboard used to give characters or various kinds of instruction commands to this system, 104 denotes a pointing device (a mouse), 105 denotes an image scanner for reading in halftone images such as a photograph, 106 denotes a binary conversion processing section for converting multi-level image data output from the image scanner 105 to binary image data, 107 denotes an image memory in which binary images output from the binary conversion processing section are stored, 108 denotes a VRAM in which an image to be displayed is stored, 109 denotes a usual interlace type display device (hereinafter referred to as a CRT) on which images stored in the VRAM 108 are displayed, and 110 denotes a printer for recording binary images with dots in an on/off state, which printer is a laser printer in this embodiment. Reference numeral 111 denotes an external storage device in which various kinds of programs related to the image editing of this system and image data for editing objectives are stored. This external storage device consists of a hard disk device and a floppy disk device. Reference numeral 112 denotes a communication control section for transmitting and receiving images edited or created by this system via a line 113. The above components are each connected to a system bus 114.

In the above-described construction, in the system of the embodiment, various kinds of editing are performed on images read in by the image scanner 105 by manipulating the keyboard 103 and the mouse 104. The edited images are recorded by the printer 110 or transmitted to another system via the communication control section 112. It is generally known that a huge amount of memory capacity is required to hold multi-level image data in comparison with binary image data. For this reason, in this embodiment, a halftone image read in from the image scanner 105 is converted to a satisfactory binary image by the binary conversion processing section 106 and stored in the image memory 107. The manuscript image is displayed on the CRT 109 by writing a suitable portion, or all, of the images stored in the image memory 107, in the VRAM 108, and an operator performs editing such as reduction. An indication of edited contents is added to or written over the image data stored in the image memory 107. A printout, communication, etc., should then be performed in accordance with well-known procedure.

As previously explained, the multi-level image data read in from the image scanner 105 is converted to a binary image by the binary conversion processing section 106, and the result is displayed. In the case where the CRT 109 is a common interlace type display device, if a binary image obtained by a conventional binary conversion process is stored in the VRAM 108 and displayed without modifications, flickering occurs in the screen and it is hard to watch the screen. Where a reduction processing is performed on the image, if a displayed image, a printout result, or further, the image printed at the other end of a line when it is transmitted to a system at the other end of the line via the line 113, is seen, only a considerably deteriorated image can be obtained. The reason for this is that in binary image data obtained by the conventionally known binary conversion processing, the correlation between neighboring two pixels in the data is low, as previously explained.

Thus, the binary conversion processing section 106 of this embodiment operates so as to prevent the occurrence of such binary images having problems. The details of the binary conversion processing section 106 of the preferred embodiment will be described in detail below.

In this embodiment, an example in which an average density approximation is improved will be explained. To make this explanation simple, in the embodiment, the values of the multi-level pixel data input from the image scanner 105 are assumed to be normalized values between 0 and 1 (including a decimal point below 1), and the case where they are binarized to "0" or "1" will be explained.

Figure 2:
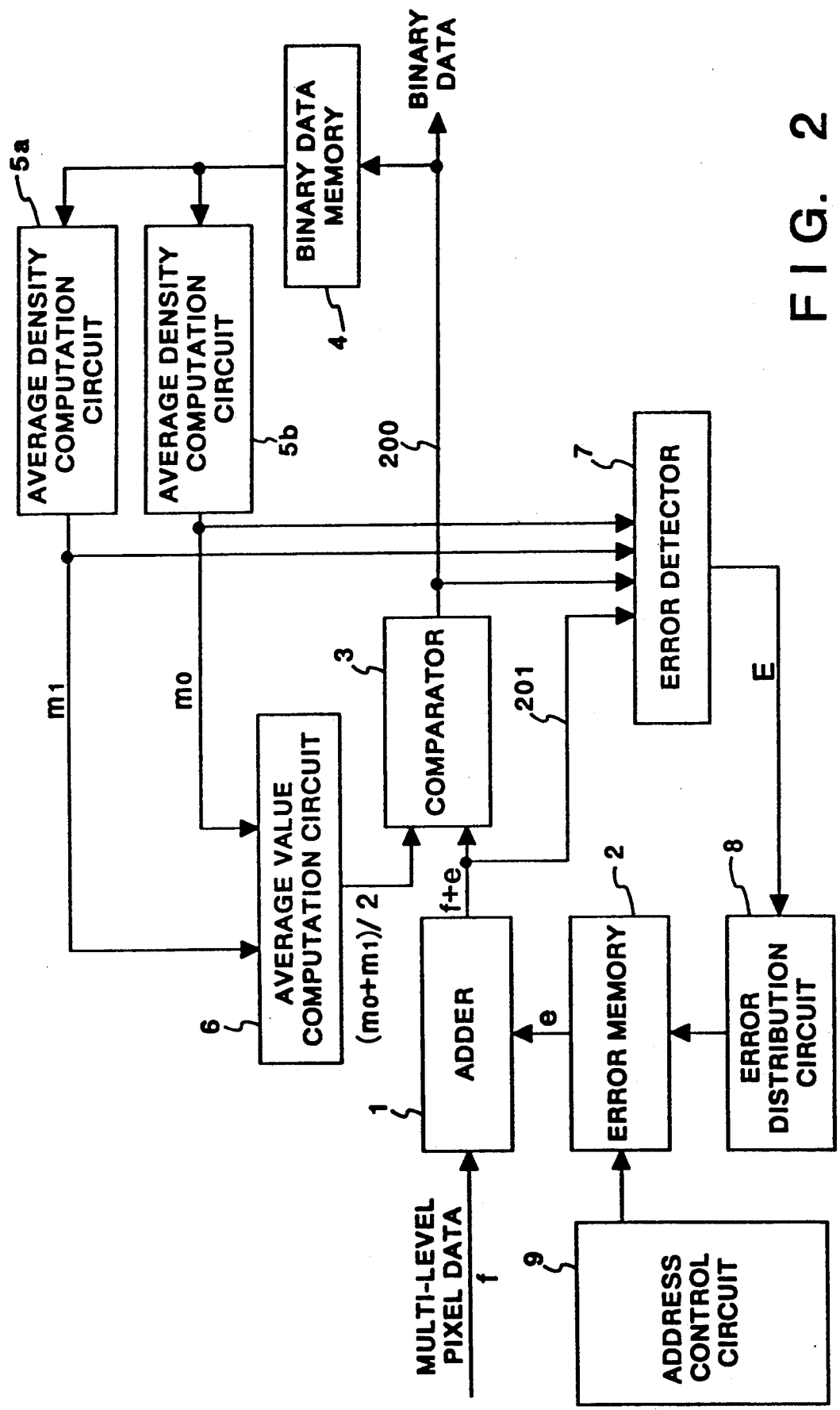
FIG. 2 is a block diagram of a binary conversion processing section according to the embodiment of FIG. 1.

FIG. 2 shows the block diagram of the binary conversion processing section 106 of this embodiment.

Multi-level pixel data "f" obtained by the image scanner 105 is input to one of the input terminals of the adder 1. To the other input terminal of the adder 1, an error value "e", which has already been distributed to the objective pixel data position in the error memory 2, is supplied. The adder 1 computes the sum of these two inputs and outputs the result "f+e". This computation result is supplied to one of the input terminals of the next comparator 3. The comparator 3 compares the value "f+e" from the adder 1 with the threshold value data (the output from the average value computation circuit 6) supplied to its other input terminal to generate binary data "B" and outputs it onto a line 200.

Binary data output from the comparator 3 is supplied to the image memory 107 and a binary data memory 4 and also to the error detector 7, as shown in FIG. 2. The binary data memory 4, formed from a line memory for several lines, is designed to store data which has been binarized earlier than binary data in addition to the binary data of the objective pixel output from the comparator 3. Pixels which have already been binarized in the vicinity of the objective pixel position which are stored in the binary data memory 4 are supplied to average density computation circuits 5a and 5b. The average density computation circuits 5a and 5b compute an average density of the objective pixel position in accordance with a preassigned weight coefficient from input binarized pixel data. The average density computation circuit 5a, however, computes an average density value $m_1$ in the case where it is assumed that binary conversion data at the objective pixel position is binarized to "1", and the average density computation circuit 5b computes an average density value $m_0$ in the case where it is assumed that binary conversion data at the objective pixel position is binarized to "0".

The average value computation circuit 6 receives the density average values $m_1$ and $m_0$ from these average density computation circuits 5a and 5b, computes their average value "$(m_0+m_1)/2$", and supplies it, as a threshold value, to one of the input terminals of the comparator 3 previously described.

Meanwhile, the error detection circuit 7 detects an error value when the objective pixel is binarized on the basis of an average density value (an average density value when it is assumed that the objective pixel is binarized to "1") from the average density computation circuit 5a and a signal 201 before the objective pixel from the adder 1 is binarized, and supplies it to an error distribution circuit 8 when the logic level of the binarized signal 200 by the comparator 3 is "1". When the logic level of the binarized signal 200 is "0", the error detection circuit 7 receives an average density value (an average density value when it is assumed that the objective pixel is binarized to "0") output from the average density computation circuit 5b and a signal 201 before the objective pixel from the adder 1 is binarized, detects an error value generated when the objective pixel is binarized, and supplies it to the error distribution circuit 8.

The error distribution circuit 8 receives the error value from the error detector 7 and distributes it (accumulative addition) to the positions of pixels which have not been binarized positioned in the vicinity of the objective pixel in the error memory 2 in accordance with a predetermined weight coefficient. An address control circuit 9 controls the generation of an address by which an error value e accumulated at the objective pixel position is read out from the error memory 2 and a reading/writing address by which the error distribution circuit 8 distributes the error value to the error memory 2.

The binary conversion processing section 106 in the above-described construction will now be explained in detail.

Figure 3A:

In FIG. 3(A), f(i,j) indicates multi-level pixel data now to be binarized at the objective pixel position. Pixel positions over the broken line each indicate that the pixel has already been binarized. When a binary conversion processing on the objective pixel is terminated, the object to be binarized next shifts to a multi-level pixel f(i+1,j). Hereafter, the processing moves by one pixel in line with the paper and is performed during the processing for one line.

B(i,j) in FIG. 3(B) indicates binary data after binary conversion. "R()" in FIG. 3(C) shows an example of a weight mask used to determine an average density in the vicinity of the objective pixel. In the embodiment, a mask of a 3×2 size shown in FIG. 4 is to be used.

The contents of the computation by the average density computation circuits 5a and 5b will be explained below.

If a vicinity average density when the objective pixel is binarized to "1" is defined as $m_1(i,j)$ and that when an objective pixel is binarized to "0" is defined as $m_0(i,j)$, each of these can be computed by the following equations:

$$m_1(i,j) = \sum_{y=-1}^{0} \sum_{x=-1}^{1} R(x,y) \times B(i+1,j+y) \quad (1)$$

where $B(i,j)=1$, and $$m_0(i,j) = \sum_{y=-1}^{0} \sum_{x=-1}^{1} R(x,y) \times B(i+1,j+y) \quad (2)$$

where $B(i,j)=0$.

That is, the average density computation circuit 5a calculates equation (1), and the average density computation circuit 5b calculates equation (2).

Next, the objective pixel $f(i,j)$ is binarized.

FIG. 3(D) shows binary conversion error data (stored in the error memory 2) which will be described later. An error caused when a pixel is converted to a binary value is distributed and accumulated at respective pixel positions. The multi-level data of the objective pixel is binarized from $f(i,j)$, $e(i,j)$, and equations (1) and (2) as in equation (3) shown below:

$$\text{When } f(i,j)+e(i,j) \geq (m_0(i,j)+m_1(i,j))/2, B(i,j) \leftarrow 1. \quad (3)$$

$$\text{When } f(i,j)+e(i,j) < (m_0(i,j)+m_1(i,j))/2, B(i,j) \leftarrow 0. \quad (4)$$

At this time, a binary conversion error "e" is added to input multi-level pixel data "f". Therefore, the density is stored as a whole, and a satisfactory gradation can be obtained.

Next, a binary conversion error "E" caused by the binary conversion from equations (3) and (4) is computed.

When the multi-level data of the objective pixel is binarized by equation (3), $$E = f(i,j) + e(i,j) - m_1(i,j) \quad (5)$$

When the multi-level data of the objective pixel is binarized by equation (4), $$E = f(i,j) + e(i,j) - m_0(i,j) \quad (6)$$

Figure 9:
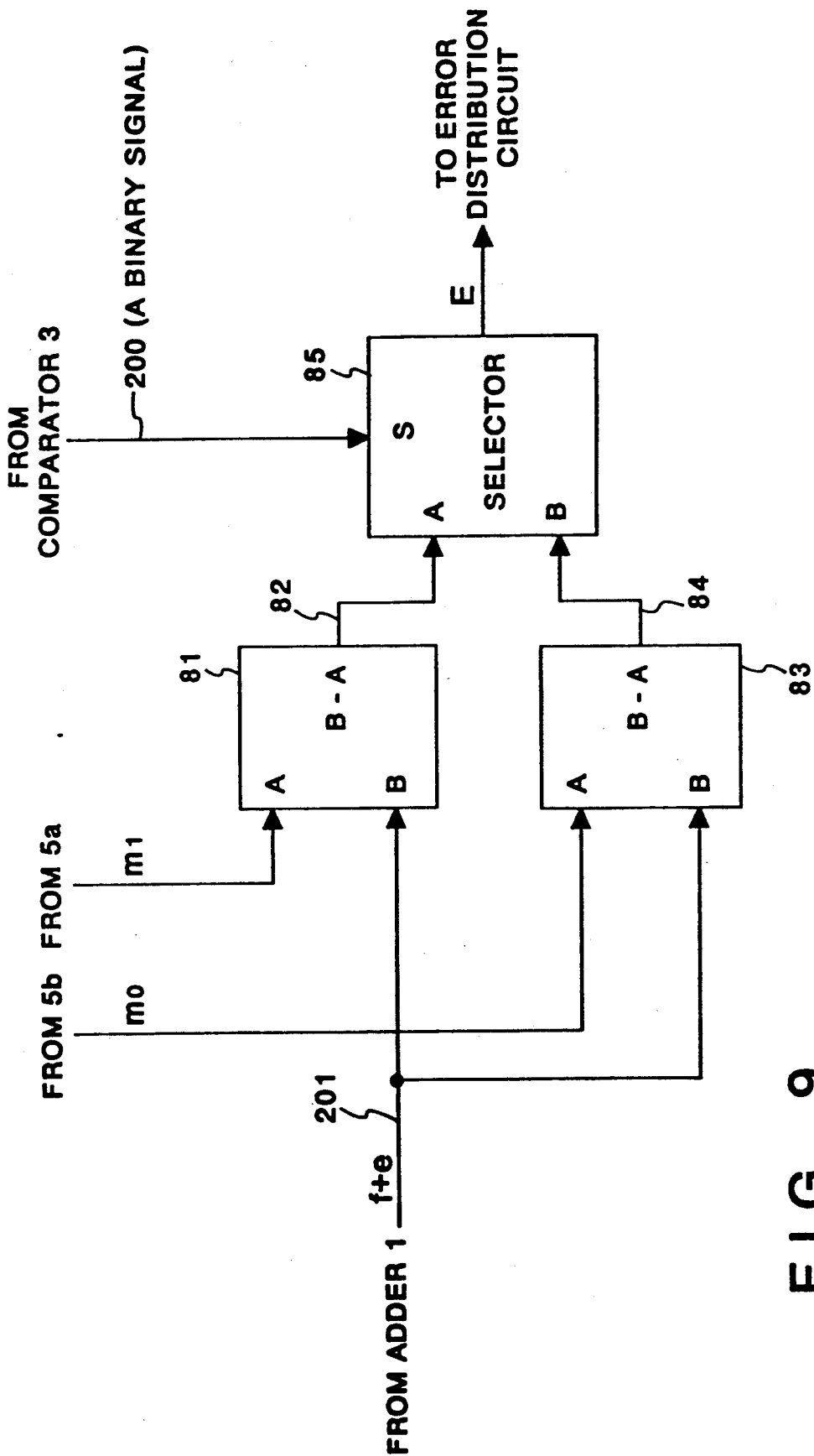
FIG. 9 is a block diagram of an error detector of the embodiment of FIG. 1.

The calculation of these equations (5) and (6) is performed by the error detection circuit 7. Its concrete circuit arrangement is as shown in FIG. 9.

A subtracter 81 (or a subtracter 83) computes "B-A" on the basis of data supplied to their own input terminals A and B and outputs the result to a signal line 82 (or a signal line 84). A selector 85 selects data which is input to the input terminal A and outputs it when the logic level of a signal input to its own select terminal S is "1". Conversely, the selector 85 selects data which is input to the input terminal B and outputs it when the logic level of a signal input to its own select terminal S is "0".

In the above mentioned error detector 7, a value $m_1$ from the average density computation circuits 5a and 5b is supplied to the input terminal A of the subtracter 81, and a value "f+e" from the adder 1 is supplied to the other input terminal B. Consequently, this subtracter 81 computes the above-mentioned equation (5). The subtracter 83 computes equation (6) since a value $m_0$ from the average density computation circuit 5b and a "f+e" from the adder 1 are input to its own two input terminals. The results computed by these subtracters 81 and 83 are input to the input terminals A and B via the signal lines 82 and 84. The selector selects data from the subtracter 81 when the level of a binary signal from the comparator 3 is "1". Conversely, the selector selects data from the subtracter 83 when the level is "0". It outputs the selected data as a binary conversion error "E".

The binary conversion error "E" computed as described above is distributed, at a suitable ratio, weight mask to the pixels in the vicinity of the objective pixel position $(i,j)$ in preparation for the binary conversion processing which is performed on multi-level pixels input subsequently to the currently objective multi-level pixel. However, if the binary conversion error "E" is distributed to a pixel $(i+1,j)$, $(i,j+1)$, or other pixel positions nearest the objective pixel position $(i,j)$ at this distribution time, a problem as previously noted arises. Therefore, the binary conversion error "E" is distributed to pixels other than those pixels noted above.

As a ratio value for distribution, a matrix shown as $S(x,y)$ in FIG. 5(A) is used. To be specific, those matrices shown in FIGS. 5(B) or 5(C) are considered. The value of each unbinarized pixel position is updated by the following equation on the basis of the distribution ratio $S(i,j)$ and the binary conversion error "E":

$$e(i+x,j+y) \leftarrow e(i+x,j+y) + E \times S(x,y), (x=-1 \text{ to } 2, y=0 \text{ to } 2) \quad (7)$$

When the binary conversion error "E" is distributed, for example, in accordance with the distribution ratio shown in FIG. 5(B), the address control circuit 9 generates an address two pixels away from the objective pixel and an address two lines away from the objective pixel in addition to an address by which an error value e corresponding to the position of the objective multi-level pixel is read in. These addresses should be generated in sequence in synchronization with a clock of a frequency sufficiently higher than that of a reference clock for inputting one multi-level pixel. The error value which has been stored at an address position two pixels away from the read-out objective pixel is added with the half of the error E output from the error detector 7 and is written again in that address position. Similarly, the same processing is performed on an error read in from a position two lines away from the objective pixel.

The binary data output after the above-described processes are performed is stored in the image memory 107 shown in FIG. 1 and will be used later in an editing process such as a reduction. This editing process itself is performed by a well-known process, and thus a detailed description thereof is omitted. However, the editing result is reflected in the image memory 107. When the operator specifies a printing instruction from the keyboard 103 or the mouse 104, the edited image can be printed by outputting the image spread in the image memory 107 to a printer 110. Of course, when a transmission instruction is specified, an image in the image memory 107 is transmitted to a system at the other end of a line via the communication control section 112. In any case, it was found that the binary image of the embodiment obtained in the above way stands comparison with those obtained by the conventional technology which distributes an error to the nearest pixel position of the objective pixel by using a weight coefficient shown in FIG. 6. In addition to that, it was confirmed that a remarkably satisfactory result is obtained in the case where the process of the embodiment mentioned above is performed, in comparison with the result of a printout performed by thinning out every other pixel to reduce the binary image by half. That is, when the process of the present embodiment is performed, image deterioration can be kept to a minimum even if a reduction print is made because the correlation among adjacent pixels is high. Where the CRT 109 is an interlace type display device, flickering in the binary image obtained by the binary conversion processing section 106 of the embodiment is prevented, and thus an image which is easy to watch can be obtained.

(Second Embodiment)

In the above-described first embodiment, the case where the present invention is applied to the average density approximation was explained. However, the present invention is not limited to this case. For example, the present invention may be applied to an error diffusion method. The error diffusion method will now be explained briefly. This method is a technique by which an error caused when the objective multi-level pixel is binarized is distributed to the unbinarized pixel positions in accordance with predetermined weighting coefficients. For a distribution matrix, for example, ratios (weight coefficients) shown in FIG. 7 are often used.

In this second embodiment, the distribution ratios for the nearest pixels of the objective pixel are taken substantially to be "0", as shown in FIGS. 8(A) and 8(B). As a result, it is possible to obtain the same effect as that explained in connection with the previous embodiment. As regards a circuit arrangement based on the error diffusion method, a well-known one can be adopted, and thus a detailed description thereof is omitted.

As has been described above, according to the first and second embodiments, image deterioration when an image is reduced by thinning out can be prevented. The flickering of an image when binary data is displayed on an interlace type display device can also be prevented.

In the above-described first and second embodiments, the image scanner 105 was described as being the input destination for multi-level pixel data and the image memory 107 as the output destination. However, the present invention is not limited to this case. For example, the input destination may be a host computer that performs image editing, and the like, and the output destination may be a printer, a display device, and the like.

In the above-described first and second embodiments, an error occurred is distributed to the position of any pixel in the vicinity of the objective pixel except for adjacent pixels. However, the present invention is not limited to this since all that is needed is that the correlation among adjacent pixels be made higher. For example, an attempt can be made so that an error is not distributed to pixel positions within a distance of pixels l from the objective pixel. That is, the case of l=1 is explained in connection with the foregoing embodiments. A keyboard may be provided on the outside so that this variable l can be set freely from the keyboard by the operator.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus that converts multi-level pixel data to binary pixel data and outputs it while keeping the density of the multi-level pixel data, comprising a binary conversion means that distributes a density error caused when binary data corresponding to input objective pixel data is generated, to the unbinarized pixel positions in the vicinity of an objective pixel except unbinarized pixel positions adjacent to the objective pixel.

2. The image processing apparatus according to claim 1, wherein said binary conversion means binarizes multi-level pixel data to binary pixel data in accordance with an average density approximation.

3. The image processing apparatus according to claim 1, wherein said binary conversion means binarizes multi-level pixel data to binary pixel data in accordance with an error diffusion method.

4. The image processing apparatus according to claim 1, wherein a coefficient at the position of a pixel adjacent to an objective pixel in a distribution matrix of density errors used in said binary conversion means is taken substantially to be "0".

5. An image processing apparatus that converts multi-level pixel data to binary pixel data and outputs it, comprising:

input means for accepting multi-level pixel data;

binary conversion means for converting multi-level pixel data input from the input means to binary pixel data on the basis of a threshold value;

output means for outputting the binary pixel data which has been binarized by said binary conversion means;

a first memory in which errors caused when multi-level pixel data of as much as two or more lines is binarized by said binary conversion means are stored;

a second memory in which binary pixel data of as much as two or more lines binarized by said binary conversion means is stored;

correction means for correcting multi-level pixel data input by said input means with error data accumulated in the vicinity of the positions of the multi-level pixel data in said first memory;

first average density computation means for computing an average density value at the objective pixel position in the case where it is assumed that the objective multi-level pixel data corrected by said correction means is binarized to the darkest density pixel data, on the basis of binarized pixel data stored in said second memory;

second average density computation means for computing an average density value at the objective pixel position in the case where it is assumed that the objective multi-level pixel data corrected by said correction means is binarized to the lightest density pixel data, on the basis of binarized pixel data stored in said second memory;

computation means for computing the average value of the average density values computed by said first and second average density computation means as a threshold value;

detection means for detecting an error value caused when the multi-level pixel data is binarized by said binary conversion means; and distribution means for distributing an error value detected by said detection means to unbinarized pixel positions except at least pixel positions adjacent to the objective pixel position in said first memory.

6. The image processing apparatus according to claim 5, wherein said detection means comprises:

first subtraction means for subtracting the value of the multi-level pixel data corrected by said correction means from the value computed by said first average computation means;

second subtraction means for subtracting the value of the multi-level pixel data corrected by said correction means from the value computed by second average computation means; and selection means for selecting and outputting either one of the values obtained by said first and second subtraction means, as an error value, on the basis of the value of binary data of the objective pixel binarized by said binary conversion means.

7. An image processing system in which a manuscript image is read out as a multi-level image, the read-out multi-level image is converted to a binary image by a binary conversion means, and the converted image is displayed and edited, wherein said binary conversion means distributes a density error caused when multi-level pixel data constituting the read-out multi-level image is converted to binary pixel data, to unbinarized pixel positions in the vicinity of an objective pixel except at least unbinarized pixel positions adjacent to the objective pixel position.

8. The image processing system according to claim 7, wherein said binary conversion means binarizes multi level pixel data to binary pixel data in accordance with an average density approximation.

9. The image processing system according to claim 7, wherein said binary conversion means binarizes multi-level pixel data to binary pixel data in accordance with an error diffusion method.

10. The image processing apparatus according to claim 7, wherein a coefficient at the position of a pixel adjacent to the objective pixel in a density error distribution matrix used by said binary conversion means is taken substantially to be "0".

11. An image processing system in which a manuscript image is read out as a multi-level image, the read-out multi-level image is converted to a binary image by a binary conversion means, comprising:

binary conversion means for converting multi-level pixel data constituting said multi-level image to binary pixel data on the basis of a threshold value;

a first memory in which two or more lines of density errors caused when a multi-level image is binarized by said binary conversion means are stored;

a second memory in which two or more lines of binary pixel data binarized by said binary conversion means are stored;

correction means for correcting read-out multi-level pixel data with error data accumulated in the vicinity of the positions of the multi-level pixel data in said first memory;

first average density computation means for computing an average density value at the objective pixel position in the case where it is assumed that the objective multi-level pixel data corrected by said correction means is binarized to the darkest density pixel data, on the basis of binarized pixel data stored in said second memory;

second average density computation means for computing an average density value at the objective pixel position in the case where it is assumed that the objective multi-level pixel data corrected by said correction means is binarized to the lightest density pixel data, on the basis of binarized pixel data stored in said second memory;

computation means for computing the average value of the average density values computed by said first and second average density computation means as a threshold value;

detection means for detecting an error value caused when the multi-level pixel data is binarized by said binary conversion means; and distribution means for distributing an error value detected by said detection means to at least one unbinarized pixel position except pixel positions adjacent to the objective pixel position in said first memory.

12. The image processing apparatus according to claim 11, wherein said detection means comprises:

first subtraction means for subtracting the value of the multi-level pixel data corrected by said correction means from the value computed by said first average computation means;

second subtraction means for subtracting the value of the multi-level pixel data corrected by said correction means from the value computed by said second average computation means; and selection means for selecting and outputting either one of the values obtained by said first and second subtraction means, as an error value, on the basis of the value of binary data of the objective pixel binarized by said binary conversion means.

* * * * *

UNITED STATES PATENT AND TRADEMARK OFFICE
CERTIFICATE OF CORRECTION

PATENT NO. : 5,130,819
DATED : July 14, 1992
INVENTOR(S) : KENICHI OHTA

It is certified that error appears in the above-identified patent and that said Letters Patent is hereby corrected as shown below:

COLUMN 1

Line 37, "negative sign," should read --negative in sign,--.

COLUMN 2

Line 47, "multi level" should read --multi-level--.

COLUMN 4

Line 23, "EMBODIMENT" should read --EMBODIMENTS--.

COLUMN 5

Line 12, "procedure." should read --procedures.--.
Line 39, "this" should read --the-- and "the" should read --this--.

COLUMN 6

Line 65, ""R() "" should read --"R( )"--.

COLUMN 7

Line 64, "above mentioned" should read --above-mentioned--.

COLUMN 8

Line 3, "a "f+e" should read --a value "f+e"--.
Line 14, "ratio, weight" should read --ratio or weighting provided by a weighting--.
Line 63, "spread" should read --stored--.

UNITED STATES PATENT AND TRADEMARK OFFICE
CERTIFICATE OF CORRECTION

PATENT NO. : 5,130,819
DATED : July 14, 1992
INVENTOR(S) : KENICHI OHTA

It is certified that error appears in the above-identified patent and that said Letters Patent is hereby corrected as shown below:

COLUMN 8

Line 67, "section 112. In" should read
--section 112. ¶ In--.

COLUMN 9

Line 63, "pixels 1" should read --1 pixels--.

COLUMN 11

Line 39, "multi" should read --multi- --.

Signed and Sealed this

Second Day of November, 1993

Attest:

BRUCE LEHMAN

Attesting Officer          Commissioner of Patents and Trademarks